US009933951B2

(12) United States Patent
Amit et al.

(10) Patent No.: US 9,933,951 B2
(45) Date of Patent: *Apr. 3, 2018

(54) REDUCING READ LATENCY USING A POOL OF PROCESSING CORES

(71) Applicant: INTERNATIONAL BUSINESS MACHINES CORPORATION, Armonk, NY (US)

(72) Inventors: Jonathan Amit, Omer (IL); Amir Lidor, Binyamina (IL); Sergey Marenkov, Yehud (IL); Rostislav Raikhman, Rishon-leZion (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/000,363

(22) Filed: Jan. 19, 2016

(65) Prior Publication Data

US 2016/0139825 A1 May 19, 2016

Related U.S. Application Data

(63) Continuation of application No. 14/590,724, filed on Jan. 6, 2015, now Pat. No. 9,262,080, which is a continuation of application No. 13/523,605, filed on Jun. 14, 2012, now Pat. No. 8,930,633.

(51) Int. Cl.
*G06F 3/06* (2006.01)
*G06F 9/50* (2006.01)
*G06F 11/34* (2006.01)

(52) U.S. Cl.
CPC ............ *G06F 3/0611* (2013.01); *G06F 3/067* (2013.01); *G06F 3/0613* (2013.01); *G06F 3/0631* (2013.01); *G06F 3/0659* (2013.01); *G06F 3/0665* (2013.01); *G06F 3/0683* (2013.01); *G06F 9/5061* (2013.01); *G06F 9/5083* (2013.01); *G06F 11/3409* (2013.01); *G06F 3/061* (2013.01); *G06F 3/0653* (2013.01); *G06F 11/3485* (2013.01); *G06F 2209/504* (2013.01); *G06F 2209/5011* (2013.01); *Y02B 60/142* (2013.01)

(58) Field of Classification Search
CPC .... G06F 3/0611; G06F 3/0613; G06F 3/0631; G06F 3/0659; G06F 9/5061; G06F 9/5083

See application file for complete search history.

(56) References Cited

U.S. PATENT DOCUMENTS

| 9,086,973 | B2* | 7/2015 | Vorbach | G06F 9/526 |
| 2009/0328055 | A1* | 12/2009 | Bose | G06F 1/3203 |
| | | | | 718/105 |
| 2010/0083273 | A1* | 4/2010 | Sihn | G06F 9/5016 |
| | | | | 718/104 |
| 2011/0153953 | A1* | 6/2011 | Khemani | G06F 12/0895 |
| | | | | 711/136 |

(Continued)

*Primary Examiner* — Ryan Bertram
(74) *Attorney, Agent, or Firm* — Griffiths & Seaton PLLC (57) ABSTRACT

In a read processing storage system, using a pool of CPU cores, the CPU cores are assigned to process either write operations, read operations, and read and write operations, that are scheduled for processing. A minimal number of the CPU cores are allocated for processing the write operations, thereby increasing write latency.

39 Claims, 7 Drawing Sheets

(56) References Cited

U.S. PATENT DOCUMENTS

2011/0314233 A1\* 12/2011 Yan ................... G06F 17/30501
                                                            711/154
2013/0219136 A1\*  8/2013 Nakamura .............. G06F 3/061
                                                            711/162

\* cited by examiner

FIG. 7 ate the write cache (which hides the latency from the user) is able to absorb the increased latency without a user detecting the increased write latency.

It should be noted that the reduction in read latency isn't reducing the read latency of a single read request, but reducing the overall read latency of the entire read requests within the queue. For example, if there are 10 requests in a queue and each single request has either a 1 millisecond latency queue or a 2 millisecond latency delay (depending on the type of request), the total, combined latency of all of the requests within the queue is either 10 milliseconds, at a minimum, or 20 milliseconds at a maximum. Also, the last request is receiving all of the previous requests latency due to the delay in the queue. For requests that are unpredicted and random, there is currently no method for controlling and reducing the total, combined latency of all of the requests within the queue to the smallest possible value.

Because the write latency is greater than the read latency, the illustrated embodiments described herein, provide for the reduction in the read latency on all unpredicted, random read requests, by assigning the CPU cores to either process write operations, read operations, and/or read and write operations. A maximum number of the CPU cores are set for processing only the read operations, thereby lowering a read latency. A minimal number of the CPU cores are allocated for processing the write operations, thereby increasing write latency. Upon reaching a throughput limit for the write operations, which causes the minimal number of the plurality of CPU cores to reach a busy status, the minimal number of the plurality of CPU cores for processing the write operations is increased.

Since the write cache is effective in hiding the latency from the user, while the read cache is inefficient for hiding the latency, scheduling for the read operations and the write operations is performed so as to lower the read latency that is visible to the user, while increasing the write latency which is hidden. In other words, by scheduling the write operations and read operations, the read latency, which is visible to the user, is significantly reduced while increasing the write latency, which is hidden. Thus, the scheduling is specifically performed for processing the read requests in a storage system on a maximum number of CPU cores and processing the write requests in a storage system on a minimal number of CPU cores. In other words, the read and write requests are not mixed in a queue for a specific CPU core, but are assigned to a specific processing core. Only when all of the CPU cores reach a busy state will the read requests and the write requests be permitted to be processed on each one of the CPU cores.

The new scheduling operation, schedules I/O requests by allocating to each CPU processing core, in a pool of CPU processing cores, either, a write only request, and/or a read and a write request. A maximum number of cores are set and defaulted for processing only the read requests. A minimal amount of cores are allocated for processing only the write requests. The write operation bandwidth is sustained by measuring core idle times and thresholds enforcement. The threshold may be a some predetermined set of criteria to determine if a CPU core is idle or busy. For example, on set of criteria could be the throughput limit available on the CPU core for processing the write operations before the write cache can no longer sustain without detection, the increased, but hidden, write latency. The criteria may also be the declaring a CPU core busy when 100% of the processing power has been consumed, thus anything less than 100% processing power consumption would be in an idle state.

The threshold is used to change the CPU cores from one state to another state (e.g., from an idle state to a busy state). Moreover, a CPU core may be considered to be in the idle state when the CPU core has not processed read/write request (e.g., a task for CPU core or write) during specified threshold time period. A CPU core may also be considered to be in the busy state when the CPU core has processed at least one read/write during a specified threshold time period. Each of these factors may be used independent of each other or may be combined to establish the threshold for determining either a busy state or an idles state of the CPU cores. On fully loaded systems, where all CPU cores have reached a busy status, all processing cores are assigned to perform both the read and write processing tasks. Moreover, when scheduling I/O requests between CPU cores that have different processing power, a threaded weight value is assigned to each one of a plurality of CPU cores. In this way, the CPU cores are able to not only receive permission to process only a specific type of operation (e.g., receive permission to only process read requests), but also, the TWV allows each CPU core to proportionally process the requests according to processing power of the CPU core.

To illustrate the scheduling, consider the following scenario with a pool of four (4) CPU cores being used for both a write operation (e.g., read operation) and a read operation. First, rather than assigning each one of the CPU cores both read and write operations, the scheduler assigns read only requests to the first three CPU cores for processing, and assigns write only requests to a single CPU core (in this case the right most CPU core). Inherently, the write operations (e.g., the read operations) consume a significantly greater amount of processing time as compared to read operations, which consume a lesser amount of processing time. Thus, by restricting all of the write operations to only one specific CPU core (e.g., the rightmost CPU core) and allowing all other CPU cores to process only the read operations, the latency of the write operations is increased because there is a larger queue of write operations, while reducing the latency on the read operations in the other CPU cores. In other words, because there is no mix of read operations and write operations to the CPU cores, the scheduling queue for the read operations is decreased thereby lowering the read latency, but the scheduling queue for the write operations is increased thereby increasing the write latency. However, the since the write operations utilize a write cache, the increase latency is absorbed in the write cache and remains hidden from the user until the write cache can no longer sustain without detection the increased, but hidden, write latency. The write operation bandwidth is sustained by measuring core idle times and the threshold enforcement, available on the CPU core for processing the write operations.

In the event that the throughput of the write operations has increased to such a degree that the singular CPU core (e.g., the rightmost CPU core) goes to one hundred percent utilization (e.g., reached a busy state), and is no longer capable of handling the throughput of all of the write operations, an additional CPU core may be allocated to handle the write only tasks. Thus, by now having two CPU cores process the write only operations, the throughput of the write operations is maintained. Again, because the write cache hides the latency of the write operations, the only concern relating to the write operations is maintaining the throughput of the write operations. If the throughout becomes significantly large, the write cache may reach a point where the latency is no longer absorbed by the write cache. By maintaining the throughput, despite the increased latency of the write operations, the write cache continually absorbs all of the write latency of the write operations, thereby allowing the latency of the write operations to remain irrelevant and hidden to the user. The write cache may be compared to springs on a vehicle and the throughput compared to the height of a bump in the road. If the height of the bump (throughput) in the road is low the springs (write cache) will absorb all, if not most, of disturbance (write latency). If the height of the bump (throughput) in the road is high the springs (write cache) may not absorb the entire disturbance (write latency) created by a bump and a person will feel the disturbance (write latency).

The remaining two CPU cores continue to process the read only operations. The other two CPU cores only process the write only operations. Again, by restricting all write operations to two specific CPU cores (e.g., the two rightmost CPU cores) and allocating the other two CPU cores to process only the read operations, the latency of the write operations is still increased because there remains a larger queue of write operations. However, the read latency on the read operations in the two other CPU cores is still reduced. The restriction of not mixing the read and write operations to any of the CPU cores is maintained.

The process of adding an additional CPU core for processing the write only tasks may continue for an nth number of times, depending on how many CPU cores are in the pool of CPU core resources, if the throughput of the write operations has increased to such a degree that both of the two CPU cores (e.g., the rightmost CPU core) go to one hundred percent utilization and are both no longer capable of handling the throughput of all of the write operations. If the situations arises where all CPU cores are fully loaded and at one hundred percent utilization (e.g., in the busy state), the scheduler may now mix the read and write operations and assign both read and write operations to all of the CPU cores.

It should noted the illustrated embodiments described herein, may be applied and used in any technology that is performing any manipulation to data that is being written to a disk or any manipulation to data that is being read from a disk, and this manipulation is requiring processing power. For example, encryption and decompression of data two examples of technologies that are manipulating data that is being read from and/or written to a disk. Moreover, illustrated embodiments described herein, may be applied to future technology or in any technology involving bidirectional processing operations (e.g., reading and writing of the data and/or signing and verifying of data).

Figure 1:
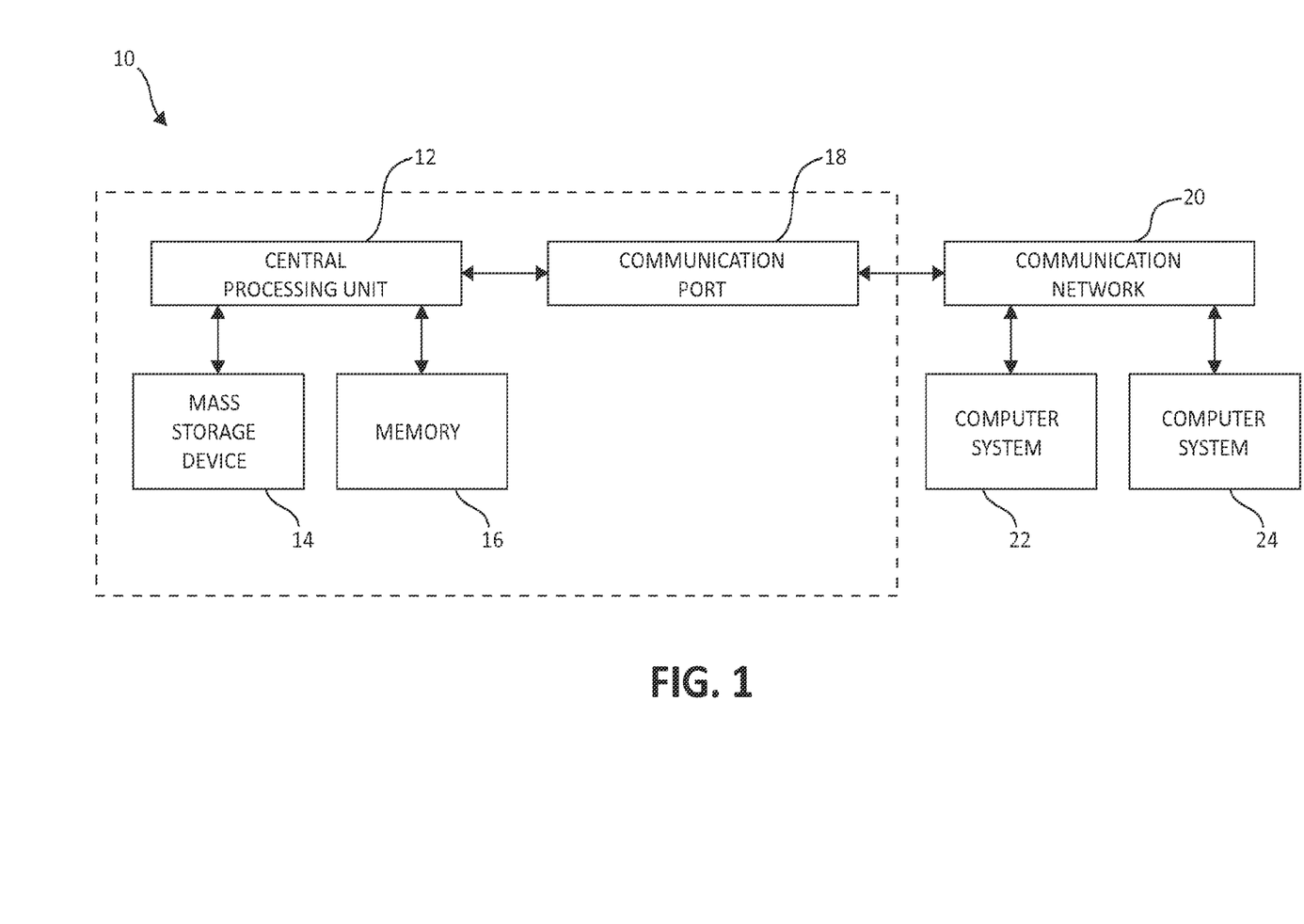

Turning now to FIG. 1, exemplary architecture 10 of data storage systems (e.g., virtual tape systems) in a computing environment is depicted. The computer system 10 includes central processing unit (CPU) 12, which is connected to mass storage device(s) 14 and memory device 16. Mass storage devices can include hard disk drive (HDD) devices, solid-state devices (SSD) etc, which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
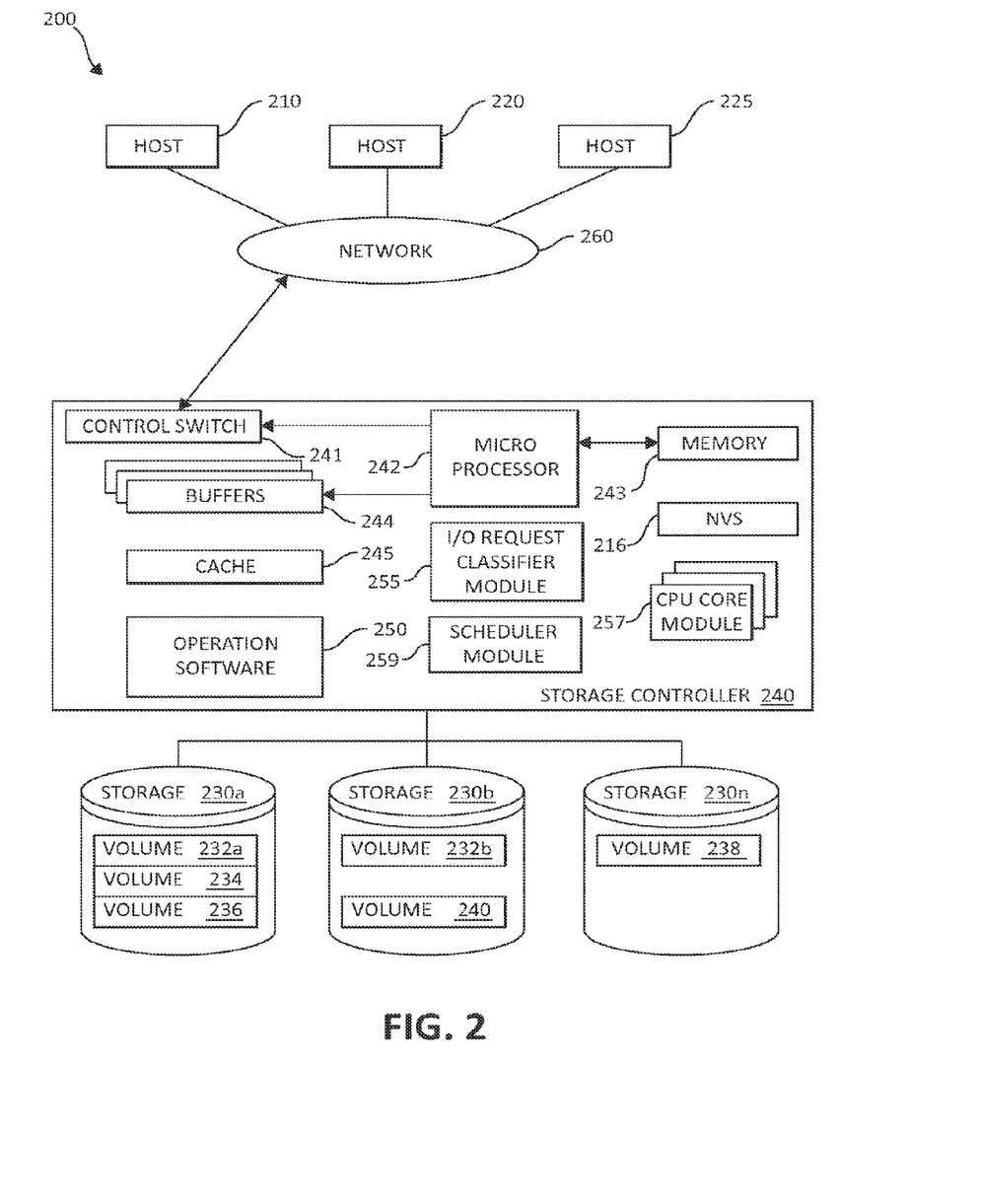

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention in a computing environment. In one embodiment, system memory 243 includes, is associated, or is in communication with the operation software 250 for in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a I/O request classifier module 255, a CPU core(s) module 257, and a scheduler module 259 in a computing environment. The I/O request classifier module 255, CPU core(s) module 257, and the scheduler module 259 may work in conjunction with each and every component of the storage controller 240, the hosts 210, 220, 225, and storage devices 230. The I/O request classifier module 255, CPU core(s) module 257, and the scheduler module 259 may be structurally one complete module or may be associated and/or included with other individual modules. The I/O request classifier module 255, CPU core(s) module 257, and the scheduler module 259 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, the I/O request classifier module 255, CPU core(s) module 257, and the scheduler module 259 on which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, the I/O request classifier module 255, CPU core(s) module 257, and the scheduler module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned previous, in one embodiment, by way of example only, the CPU cores are assigned to process either write operations, read operations, and read and write operations that are scheduled for processing. A maximum number of the CPU cores are set for processing only the read operations, thereby lowering a read latency. A minimal number of the CPU cores are allocated for processing the write operations, thereby increasing write latency. Upon reaching a throughput limit for the write operations that causes the minimal number of the plurality of CPU cores to reach a busy status, the minimal number of the plurality of CPU cores for processing the write operations is increased.

In this way, the read latency is reduced in a processing storage system with a write cache, using a pool of processor cores used for both read and write operations. The I/O requests are scheduled for lowering the read latency, which is visible to the user, while increasing the write latency that is hidden using the write cache. As will be illustrated below in FIG. 3, the illustrated embodiments first define a state of the CPU cores. The CPU cores may be either defined to be in an idle state or a busy state. A CPU core is considered to be in the idle state when the CPU core has not processed any input/output (I/O) request (e.g., a task for CPU core or write) during specified threshold. A CPU core is considered to be in the busy state when the CPU core has processed at least one I/O request/task (e.g., for read or write) during specified threshold.

For CPU cores with different processing power, a thread weight value (TWV) may be assigned. The TWV determines what proportion of the workload the CPU core will bear relative to other CPU cores. For example, if one CPU core has TWV weight of 30 and all other threads have TWV weight of 60, the 30-weight thread will bear half as much as any other thread that has the 60-weight thread.

Each I/O request will be assigned to one CPU core from a pool of CPU cores. These I/O requests/tasks that are to be sent to the CPU cores are classified as either a read operation or a write operation. Since the CPU cores are given a status of either idle or busy, the CPU cores are granted permission to handle the read operations and/or write operations, depending on the determined status (idle or busy). The read and write operations are further classified as one of at least three concrete types of operations: read only operation (R), write only operation (W) and/or read and write operation (R/W).

The default assignment of the I/O requests/tasks is to set a maximum number of CPU cores for the read operations and to allot only a minimum number of CPU cores the write operations. To sustain the write operations bandwidth, the CPU core idle time and threshold enforcement (e.g., a determination as to whether the CPU cores are in either a busy or idle state) is measured, and an additional CPU core for the I/O request for the write operations may be allocated as needed. On a fully loaded system (e.g., all CPU cores are busy) all cores may be assigned to read and write operations.

For example, consider a system with pool of four CPU cores (CPU cores #1, #2, #3, and #4) and the processing power of CPU core #1 is half as compared with all the other CPU cores. The default assignment (when all cores are IDLE) is to assign the maximum number of cores to the read operations and minimal number of cores to the write operations. Since core #1 has half as much processing powers as all other cores, the number of I/O requests scheduled for core #1 to process will be less. The scheduled number of I/O requests for core #1 will be assigned according to the TWV. When the write operations' I/O bandwidth is increasing, the CPU core #4 will become busy at the point of reaching the TWV. At this point, an additional core, which would be core #3 since it is the core that is adjacent to core #4, is assigned to perform the write I/O requests. Again, because core #1 has half as much processing powers as all other cores, the number of I/O requests scheduled for core #1 to process will be less. The scheduled number of I/O requests for core #1 will be assigned according to the TWV. When the write operations' I/O bandwidth for core #3 is increasing, the CPU core #3 will become busy at the point of reaching the TWV. At this point, an additional core, which would be core #2 since it is the core that is adjacent to core #3, is assigned to perform the write I/O requests. Again, because core #1 has half as much processing powers as all other cores, the number of I/O requests scheduled for core #1 to process will be less. The scheduled number of I/O requests for core #1 will be assigned according to the TWV. In a fully loaded system (e.g., all the cores are busy), all cores are assigned to process the read and write I/O requests. Similar to the previous stated scenarios, even when all processing cores are busy, core #1 has half as much processing powers as all other cores, the number of I/O requests scheduled for core #1 to process will be less. The scheduled number of I/O requests for core #1 will be assigned according to the TWV.

Figure 3:
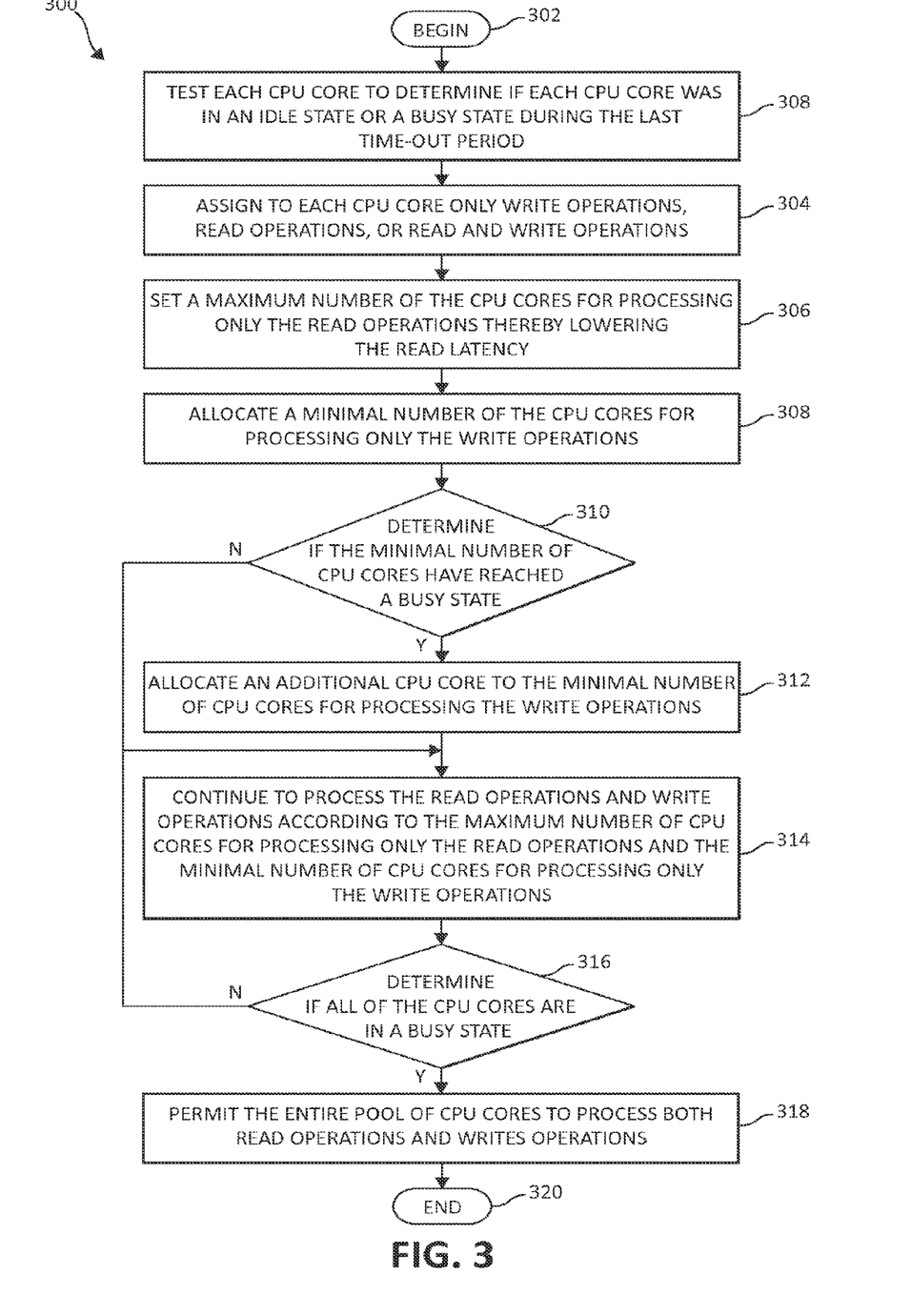

Turning now to FIG. 3, a flowchart illustrating an exemplary method 300 for reducing input/output (I/O) latency in a storage system using a pool of processors is depicted. The method 300 begins (step 302) by assigning to each CPU core only write operations, read operations, or read and write operations (step 304). A TWV may be set/assigned for the CPU cores having different processing power (e.g., the CPU cores with different processing power are assigned the TWV weight value) to assist with allocating the read operations and the write operations, for which the CPU cores have been granted access to perform, to proportionately process the read operations and the write operations according to the TWV. A maximum number of the CPU cores are set for processing only the read operations, thereby lowering the read latency (step 306). A minimal number of the CPU cores are allocated for processing only the write operations, thereby increasing the write latency (step 308). This minimal number of the CPU cores may be just one CPU core that is allocated for processing the write operations. The method 300 determines if, the minimal number of CPU cores have reached a busy status (step 310). If yes, the method 300 may allocate an additional CPU core to the minimal number of CPU cores for processing the write operations (step 312). If no, the method 300 continues to process the read operations and write operations according to steps 306 and 308 (step 314). The method 300 also determines if all of the CPU cores are in a busy status (step 316). In other words, if there is only one remaining core in the "maximum set number of CPU cores" for processing the read only operations has achieved 100% utilization or reached the TWV threshold, then this last remaining CPU core will become busy. If all of the CPU cores are in a busy status/state, the method 300 permits the entire pool of processing cores to process both read operations and writes operations (step 318). If all of the CPU cores are not in a busy status, the method 300 continues to process the read operations and write operations according to steps 306 and 308. The method ends (step 320). It should be noted that a time out period may and set for determining if the CPU cores are in an idle state or a busy state.

As mentioned previously, the read and write operations are further classified as one of at least three concrete types of operations: read only operation (R), write only operation (W) and/or read and write operation (R/W). The permissions for the read only operation (R), the write only operation (W) and/or the read and write operation (R/W) are granted to each CPU core and illustrated below in FIGS. 4-7. Also, FIGS. 4-7 illustrate how the state of the CPU cores change according to the operations described in FIG. 3.

Figure 4:
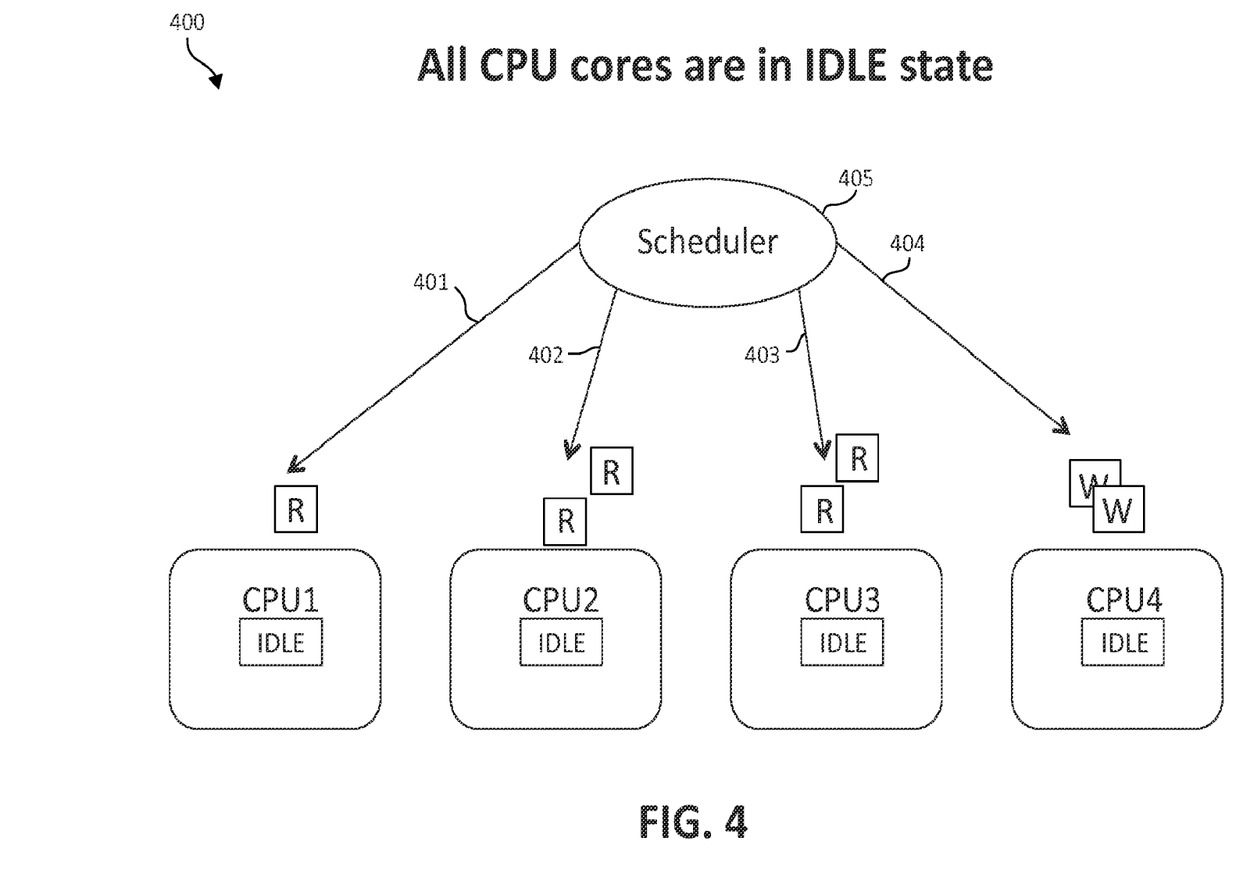

FIG. 4 is a block diagram 400 illustrating exemplary operations for reducing read latency where all CPU cores are in an idle state. When all CPU cores (labeled as CPU core1, CPU core 2, CPU core 3, and CPU core 4) are determined to be in an idle state, all threads (e.g., all CPU cores) except the last CPU core 4 (counted from left to right) will be assigned/permitted to processes only read operations (R) (labeled in FIGS. 4-7 as "R"), and the last thread (e.g., the last CPU core 4) will be permitted to process only write operations (W) (labeled in FIGS. 4-7 as "W"). In this scenario, each of the CPU cores (e.g., CPU cores 1-3), expect for the last CPU core (e.g., CPU core 4), are assigned/granted permission 401, 402, and 403 to process only read operations (R). Thus, three CPU cores 1-3 are determined to be the maximum number of cores to process the read operations (R) and the minimum number of CPU cores for processing the write operations (W) is determined to be one. For setting and determining the maximum number of CPU cores for processing the read operations (R), in one embodiment, the CPU cores are counted, starting from a firstmost position (e.g., a left most position) and continuing the counting until just previous to a lastmost position (e.g., stop counting just previous to the rightmost positioned CPU core). In other words, all CPU cores, starting from the left and counting to the right, and stopping just short of the last, right most positioned core, may be determined to be set as the maximum number of the CPU cores for being assigned the read operations (R). The lastmost (e.g., the rightmost positioned core is then considered to be the minimum number of cores for being assigned the write operations (W).

Thus, the scheduler 405 assigns/sends 401, 402, and 403 each CPU core (e.g., CPU core 1-3), expect for the last CPU core (e.g., CPU core 4), the read only operations (R). The last CPU core (e.g., CPU core 4) is assigned/granted permission 404 to process write only operations (W). More specifically, the scheduler sends to the last CPU core (e.g., CPU core 4) only the write only operations (W).

Moreover, if each CPU core is assigned a thread weight value (TWV), and the TWV determines what proportion of the work-load the CPU core will bear relative to other CPU cores, each CPU core will proportionally process the read operations and the write operations. In this scenario 400, by way of example only, CPU core 1 is assigned a lowest TWV, and CPU cores 2-4 are assigned a different TWV. Thus, based upon the TWV assigned to CPU core 1, the scheduler 405 assigns/sends 401 only 1 read only operations (R) to CPU core 1. Also, based on the TWV assigned to each of the remaining cores (CPU cores 2-4), the scheduler 405 assigns/sends 402 and 403 to CPU core 2 and CPU core 2 two read operations (R), and the scheduler 405 assigns/sends 404 to CPU core 4 two write operations (W).

As a general rule, when a CPU core from the lastmost side (e.g., the rightmost side) is determined to be in the busy state, and all other CPU cores to the left side of this lastmost CPU core (e.g., rightmost CPU core) are determined to be in the idle state, at least one additional CPU core from this lastmost side (e.g., right side) is granted permission for processing write operations. In other words, each time a CPU core from the right side and reached a busy status, and all other CPU cores from left side are in idle state, write permissions are granted to additional CPU cores from the rightmost side. (This additional CPU core, which was determined to be in the idle state, may now receive permission for the write operations. This additional CPU core is to the immediate left of the right most read unit that was determined to be in the busy mode. This process, as mentioned previously and illustrated below in FIGS. 5-6, assists in determining and setting the maximum number of cores for assigning the read operations and the minimal number of cores for the write operations.

Figure 5:
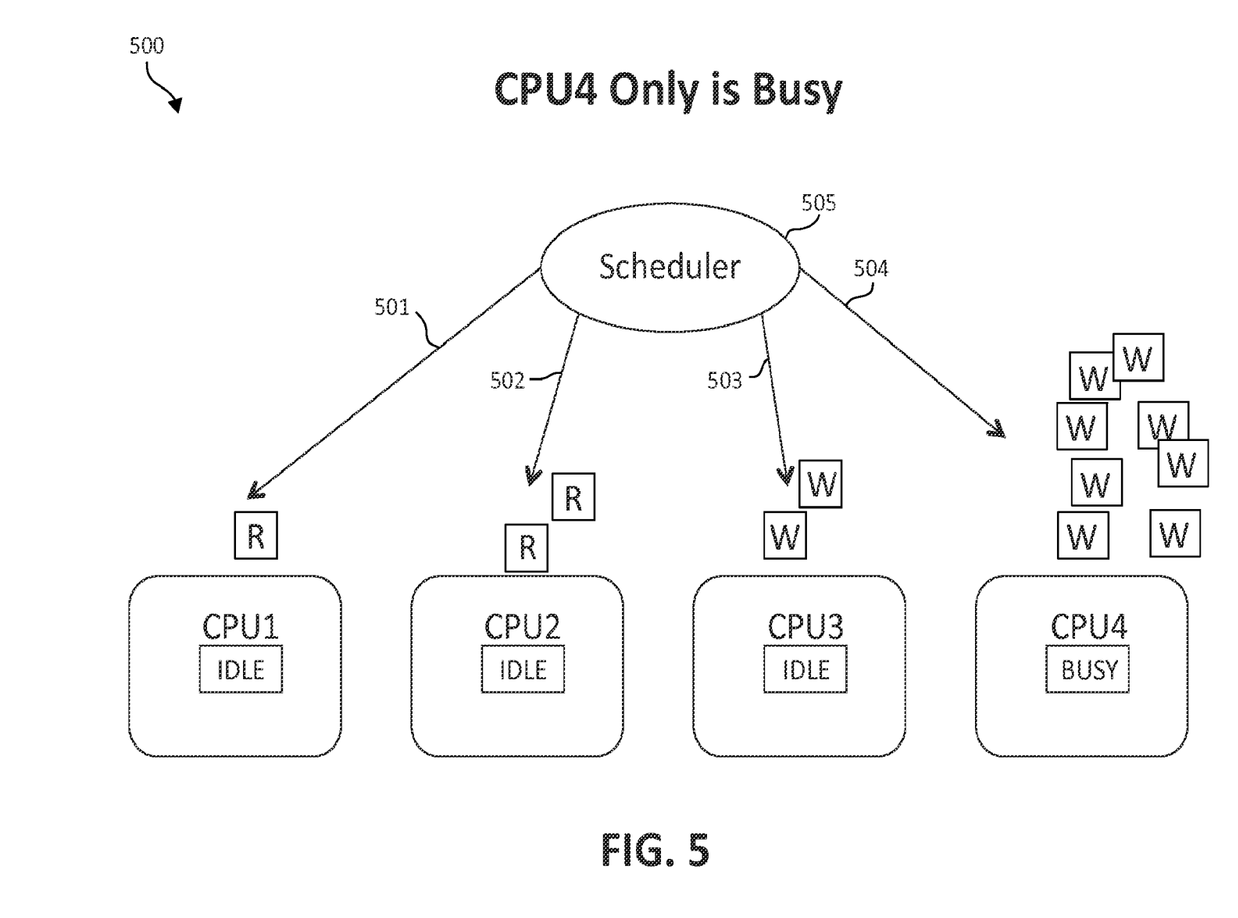

FIG. 5 is a block diagram 500 illustrating exemplary operations for reducing read latency where all CPU cores are in an idle state except for a rightmost CPU core. In this scenario all CPU cores 1-3 are determined to be in an idle state except for a rightmost CPU core 4, which is determined to be in the busy state. Thus, by applying the general rule, as mentioned above the first two threads (e.g., CPU cores 1 and 2) will be permitted to process only the read only operations (R). More specifically, the scheduler 505 assigns/sends 501 and 502 to CPU cores 1 and 2 only the read only operations (R).

Since the lastmost CPU core 4 is determined to be in a busy status, and all other CPU cores 1-3, that were to the left side of this lastmost CPU core 4 are in an idle status, an additional CPU core (e.g., CPU core 3), that is just left of this lastmost side (e.g., CPU core 3 is just left of CPU core 4), is now assigned/granted 503 permission for processing write operations (W). More specifically, the scheduler 505 sends 503 to this additional CPU core (e.g., CPU core 3) that is just left of this lastmost side of CPU cores (e.g., CPU core 4), only the write only operations (W).

As stated above, if each core is assigned a thread weight value (TWV), and the TWV determines what proportion of the work-load the CPU core will bear relative to other CPU cores, each CPU core will proportionally process the read operations and the write operations. In this scenario 500, by way of example only, CPU core 1 is assigned a lowest TWV, and CPU cores 2-4 are assigned a different TWV. Thus, based upon the TWV assigned to CPU core 1, the scheduler 505 assigns/sends 501 only 1 read only operations (R) to CPU core 1. Also, based on the TWV assigned to CPU cores 2-4, the scheduler 505 assigns/sends 503 two read only operations (R) to CPU core 2. However, CPU core 4 is in a busy status, when processing 8 write only operations (W) because the write operations' I/O bandwidth was increasing for each additional write only operation (W). At this point, CPU core 4 had a busy status, due to the throughput limit reaching a maximum allowable point before the write cache could no longer sustain, without detection, the increased, but hidden, write latency. Because of the busy status, an additional core, which would be CPU core 3 since it is the CPU core that is adjacent to CPU core 4, is assigned 503 to process only the write I/O requests (W). Thus, the scheduler 505 sends 503 two write only operations (W) to CPU core 3.

Figure 6:
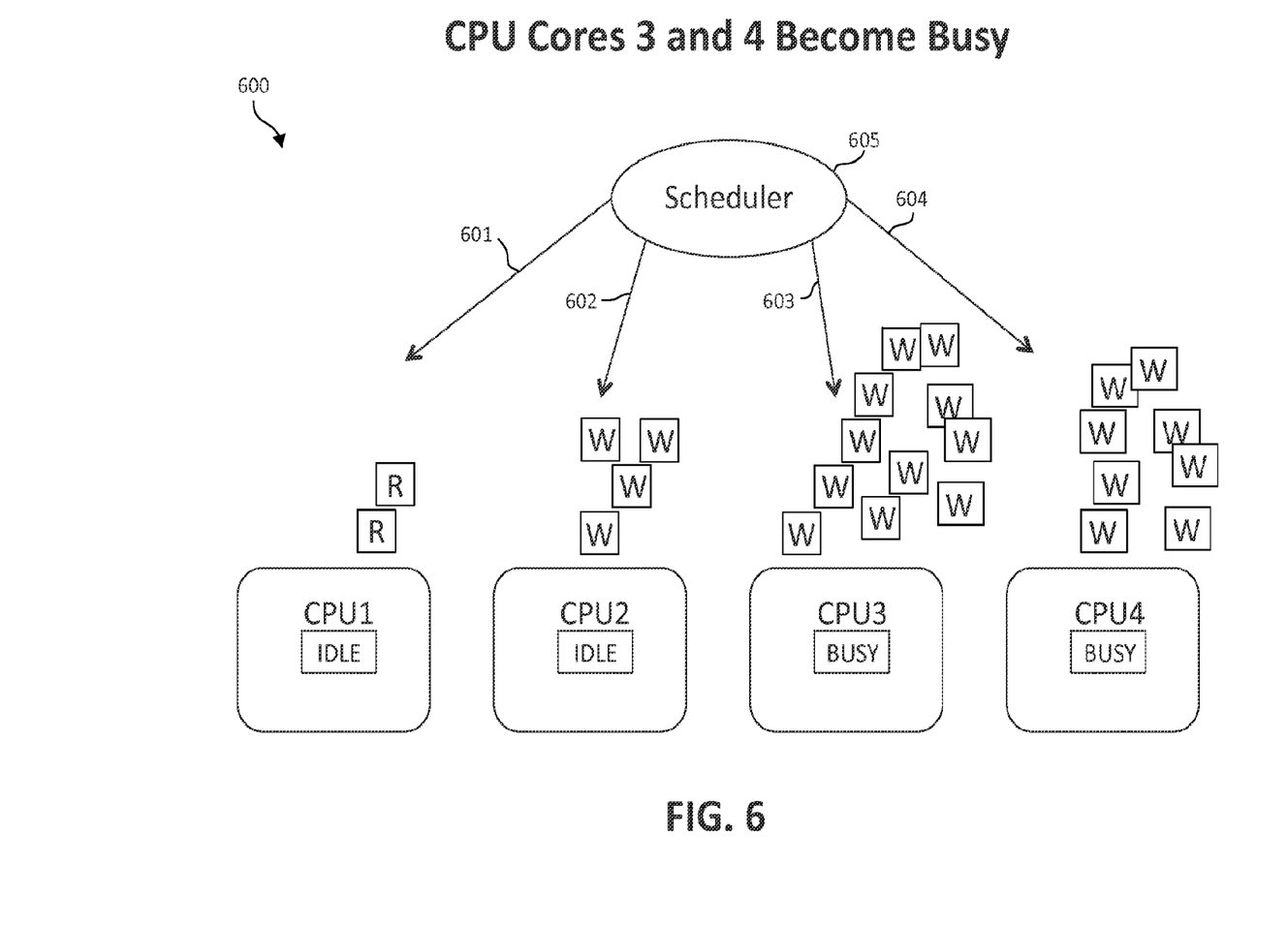

FIG. 6 is a block diagram 600 illustrating exemplary operations for reducing read latency where all CPU cores are in an idle state except for the 2 rightmost CPU cores. In this scenario CPU cores 1-2 are determined to be in an idle state. The two-lastmost/rightmost CPU cores 3-4 are determined to be in the busy state. Thus, by applying the general rule, as mentioned above, only the first thread (e.g., CPU core 1) will be assigned/permitted 601 to process only the read only operations (R). More specifically, the scheduler 605 only sends 601 to the first CPU cores (e.g., CPU core 1) the read only operations (R).

Since the two, lastmost CPU cores 3-4 were determined to be busy, an additional CPU core (e.g., CPU core 2) that is just left of the first one of the lastmost CPU cores (e.g., CPU core 3) is now assigned/granted 602 permission for processing write only operations (W). More specifically, the scheduler sends to this additional CPU core (e.g., CPU core 2) that is just left of the first one of the lastmost side of CPU cores (e.g., CPU core 3), only write operations (W), even though this additional CPU core (e.g., CPU core 2) was determined to be in the idle state. The scheduler 605 sends 603 and 604 to these two lastmost-CPU cores (e.g., CPU cores 3 and 4) only the write only operations (W).

Similar to FIG. 5 and FIG. 6, if each CPU core has a different processing power, a thread weight value (TWV) is assigned, and the TWV determines what proportion of the workload the CPU core will bear relative to other CPU cores. Each CPU core will proportionally process the read operations and the write operations, according to the TWV. In this scenario 500, by way of example only, CPU core 1 is assigned a lowest TWV, and CPU cores 2-4 are assigned a different TWV. Thus, based upon the TWV assigned to CPU core 1, the scheduler 605 assigns/sends 601 two read only operations (R) to CPU core 1. The scheduler 605 sends 602 three write only operations (W) to CPU core 2. As illustrated, CPU core 3 sends 603 ten write only operations (W). CPU core 4 sends 604 eight write only operations (W). This was because the write operations' I/O bandwidth was increasing for CPU cores 3 and 4 and both CPU cores 3-4 reached a busy status, and thus, reached a threshold limit, where the write cache could no longer sustain without detection, the increased, but hidden, write latency. Thus CPU core 3 was allocated to the minimal number of CPU cores for handing the additional write only operations (W). Thus, the scheduler 605 sends 603 three write only operations (W) to CPU core 2. CPU cores 3 and 4 continue to process the assigned/sent 603 and 604 write only operations (W).

However, when all CPU cores 1-4 are determined to be in an busy state, each one of the CPU cores are granted permission to process (e.g., handle) both read operations and write operations. This scenario is depicted in FIG. 7 below.

Figure 7:
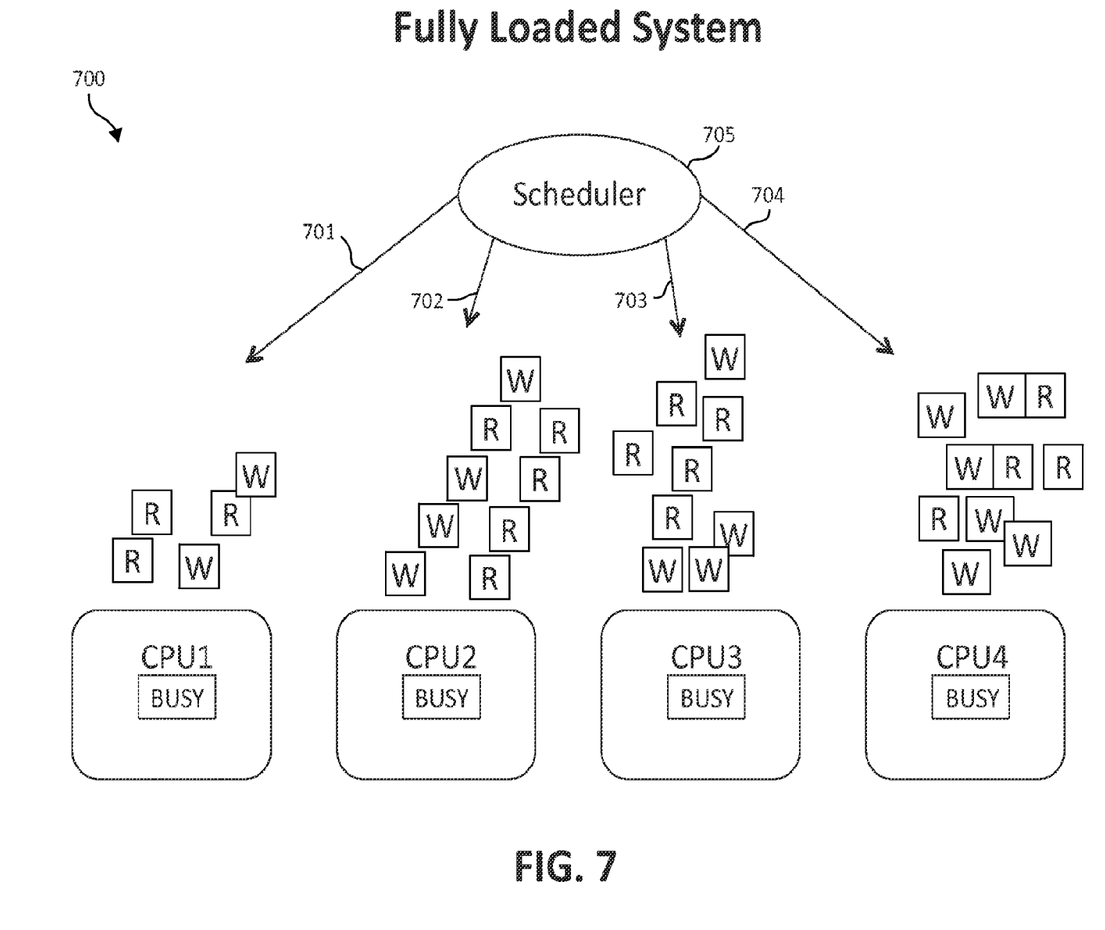

FIG. 7 is a block diagram 700 illustrating exemplary operations for reducing read (I/O) latency where all CPU cores are in the busy state. When all CPU cores 1-4 are determined to be in the busy state, all threads (e.g., all CPU cores 1-4) will be assigned/permitted 701, 702, 703, and 704 to handle both read operations and write operations (labeled in the diagram as "R" and "W" rather than as described above that indicated a "read and write operation (R/W)"). In this scenario, each of the CPU cores 1-4 is assigned/permitted 701, 702, 703, and 704 (e.g., granted permission) to process the read operations (R) and the write operations (W). More specifically, the scheduler 705 assigns/sends 701, 702, 703, and 704 to each CPU core 1-4 both the read only operations (R) and the write only operations (W).

In the fully loaded system (e.g., all the core are busy), all CPU cores are assigned to process the read and write I/O requests. Similar to the previous stated scenarios, even with all of the CPU cores reaching a busy status, core #1 has half as much processing powers as all other cores. The number of I/O requests scheduled for core #1 to process will be less because of the difference in processing power. The scheduled number of read operation for CPU core 1 will be assigned according to the TWV. Similar to FIG. 5-7, if the CPU cores 1-4 have different processing powers, each CPU core is assigned a thread weight value (TWV). The TWV determines what proportion of the workload each of the CPU cores 1-4 will bear relative to other CPU cores. In other words, based upon the TWV, each CPU core 1-4 may proportionally process the read operations (R) and the write operations (W) according to the TWV that is reflective of the processing power of the core. In this scenario 700, CPU core 1 is assigned a lowest TWV, and CPU core 2, CPU core 3, and CPU core 4 are assigned a TWV that is different than CPU core 1. Thus, based upon the TWV assigned to CPU core 1, the scheduler 705 only assigns/sends 701 three read only operations (R) and two write only operations (W) to CPU core 1. The scheduler 705 sends 702 five read only operations (R) and four write only operations (W) (9 total classified tasks) to CPU core 2. The scheduler 705 assigns/sends 703 five read only operations (R) and four write only operations (W) (9 total classified tasks) to CPU core 3 and four read only operations (R) and six write only operations (W) (10 total classified tasks) to CPU core 4.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for reducing read latency in a read processing storage system using a pool of a plurality of CPU cores, comprising:
   assigning to each one of the plurality of CPU cores for processing only one of write operations, read operations, and read and write operations that are scheduled for processing such that the write operations, the read operations, and the read and write operations are each processed independently among respective ones of the plurality of CPU cores; and
   allocating a minimal number of the plurality of CPU cores for processing the write operations, thereby increasing a write latency.

2. The method of claim 1, wherein upon reaching a throughput limit for the write operations that causes the minimal number of the plurality of CPU cores to reach a busy status, the minimal number of the plurality of CPU cores for processing the write operations is increased; and
   further including setting a maximum number of the plurality of CPU cores for processing only the read operations, thereby lowering the read latency.

3. The method of claim 1, further including scheduling the write operations, the read operations, and the read and write operations, between the pool of the plurality of processing cores, according to a thread weight value (TWV) that is assigned to each one of the plurality of processing cores having a difference in processing power.

4. The method of claim 1, further including sustaining a bandwidth of the write operations by measuring core idle time and a throughput limit.

5. The method of claim 1, further including setting a time-out period for a predetermined threshold period for processing the write operations, the read operations, and the read and write operations.

6. The method of claim 1, further including assigning the read and write operations to each of the plurality of processing cores for processing if each of the plurality of CPU cores have attained the busy status.

7. The method of claim 1, wherein the busy status represents those of the plurality of CPU cores that have processed at least one of the write operations, the read operations, and the read and write operations during a predetermined threshold period.

8. The method of claim 1, further including assigning only the read operations to the plurality of CPU cores having an idle status, wherein the idle status represents those of the plurality of CPU cores that have yet to process any of the write operations, the read operations, and the read and write operations during a predetermined threshold period.

9. The method of claim 8, further including determining whether each one of the plurality of CPU cores had one of the idle status and the busy status during a last-predetermined threshold period.

10. The method of claim 2, further including determining the maximum number of the plurality of CPU cores by, according to a scale of the TMV having a lowest value at a left side and a highest TMV value at a right side, counting, from a firstmost positioned one of the plurality of CPU cores, and sequentially counting to each CPU core to the right of the scale, until reaching a lastmost positioned one of the plurality of CPU cores, to include in the maximum number of the plurality of CPU cores to process the read operations.

11. The method of claim 10, further including determining the minimum number of the plurality of CPU cores by locating the lastmost positioned one of the plurality of CPU cores to process the write operations.

12. The method of claim 11, further including:
    if the lastmost positioned one of the plurality of CPU cores is determined to be in the busy status, and those of the plurality of CPU cores to the left of the lastmost positioned one of the plurality of CPU cores are in the idle status:
    permitting one of the plurality of CPU cores that is to the immediate left of the lastmost positioned one of the plurality of read to process the write operations.

13. The method of claim 12, further including:
    if at least one or more of an nth number of lastmost positioned ones of the plurality of CPU cores are determined to be in the busy status, and all other of the plurality of CPU cores to the left of the at least one or more of the nth number of lastmost positioned ones of the plurality of CPU cores are in the idle status:
    permitting an additional one of the at least one or more of the nth number of lastmost positioned ones of the plurality of CPU cores to process the write operations.

14. A system for reducing read latency in a read processing storage system using a pool of a plurality of CPU cores, comprising:
    at least one scheduler scheduling write operations, read operations, and read and write operations between the pool of the plurality of processing cores,
    at least one write cache, remotely connected to each of the plurality of CPU cores, assisting with the write operations;
    at least one processor device, controlling the at least one scheduler and the at least one write cache, and operable in the read processing storage system, wherein the at least one processor device:
       assigns to each one of the plurality of CPU cores for processing only one of write operations, read operations, and read and write operations that are scheduled for processing such that the write operations, the read operations, and the read and write operations are each processed independently among respective ones of the plurality of CPU cores, and
       allocates a minimal number of the plurality of CPU cores for processing the write operations, thereby increasing a write latency.

15. The system of claim 14, wherein upon reaching a throughput limit for the write operations that causes the minimal number of the plurality of CPU cores to reach a busy status, the minimal number of the plurality of CPU cores for processing the write operations is increased, and
wherein the at least one processor device sets a maximum number of the plurality of CPU cores for processing only the read operations, thereby lowering the read latency.

16. The system of claim 14, wherein the at least one processor device assigns a thread weight value (TWV) to each one of the plurality of processing cores having a difference in processing power, wherein the write operations, the read operations, and the read and write operations, between the pool of the plurality of processing cores, are proportionally scheduled by the scheduler according to the TWV.

17. The system of claim 14, wherein the at least one processor device sustains a bandwidth of the write operations by measuring core idle time and a throughput limit.

18. The system of claim 14, wherein the at least one processor device sets a time-out period for a predetermined threshold period for processing the write operations, the read operations, and the read and write operations.

19. The system of claim 14, wherein the at least one processor device assigns the read and write operations to each of the plurality of processing cores for processing if each of the plurality of CPU cores have attained the busy status.

20. The method of claim 14, wherein the busy status represents those of the plurality of CPU cores that have processed at least one of the write operations, the read operations, and the read and write operations during a predetermined threshold period.

21. The system of claim 14, wherein the at least one processor device assigns only the read operations to the plurality of CPU cores having an idle status, wherein the idle status represents those of the plurality of CPU cores that have yet to process any of the write operations, the read operations, and the read and write operations during a predetermined threshold period.

22. The system of claim 21, wherein the at least one processor device determines whether each one of the plurality of CPU cores had one of the idle status and the busy status during a last-predetermined threshold period.

23. The system of claim 14, wherein the at least one processor device determines the maximum number of the plurality of CPU cores by, according to a scale of the TMV having a lowest value at a left side and a highest TMV value at a right side, counting, from a firstmost positioned one of the plurality of CPU cores, and sequentially counting each CPU core to the right of the scale, until reaching a lastmost positioned one of the plurality of CPU cores, to include in the maximum number of the plurality of CPU cores to process the read operations.

24. The system of claim 23, wherein the at least one processor device determines the minimum number of the plurality of CPU cores by locating the lastmost positioned one of the plurality of CPU cores to process the write operations.

25. The system of claim 24, wherein the at least one processor device:
if the lastmost positioned one of the plurality of CPU cores is determined to be in the busy status, and those of the plurality of CPU cores to the left of the lastmost positioned one of the plurality of CPU cores are in the idle status:
permits one of the plurality of CPU cores that is to the immediate left of the lastmost positioned one of the plurality of read to process the write operations.

26. The system of claim 25, wherein the at least one processor device:
if at least one or more of an nth number of lastmost positioned ones of the plurality of CPU cores are determined to be in the busy status, and all other of the plurality of CPU cores to the left of the at least one or more of the nth number of lastmost positioned ones of the plurality of CPU cores are in the idle status:
permits an additional one of the at least one or more of the nth number of lastmost positioned ones of the plurality of CPU cores to process the write operations.

27. A computer program product for reducing read latency in a read processing storage system using a pool of a plurality of CPU cores, the computer program product comprising a non-transitory computer-readable storage medium having computer-readable program code portions stored therein, the computer-readable program code portions comprising:
a first executable portion that assigns to each one of the plurality of CPU cores for processing only one of write operations, read operations, and read and write operations that are scheduled for processing such that the write operations, the read operations, and the read and write operations are each processed independently among respective ones of the plurality of CPU cores; and
a second executable portion that allocates a minimal number of the plurality of CPU cores for processing the write operations, thereby increasing a write latency.

28. The computer program product of claim 27, wherein upon reaching a throughput limit for the write operations that causes the minimal number of the plurality of CPU cores to reach a busy status, the minimal number of the plurality of CPU cores for processing the write operations is increased; and
further including a third executable portion that sets a maximum number of the plurality of CPU cores for processing only the read operations, thereby lowering the read latency.

29. The computer program product of claim 27, further including a fourth executable portion that assigns a thread weight value (TWV) to each one of the plurality of processing cores having a difference in processing power, wherein the write operations, the read operations, and the read and write operations, between the pool of the plurality of processing cores, are proportionally scheduled according to the TWV.

30. The computer program product of claim 27, further including a fourth executable portion that sustains a bandwidth of the write operations by measuring core idle time and a throughput limit.

31. The computer program product of claim 27, further including a fourth executable portion that sets a time-out period for a predetermined threshold period for processing the write operations, the read operations, and the read and write operations.

32. The computer program product of claim 27, further including a fourth executable portion that assigns the read and write operations to each of the plurality of processing cores for processing if each of the plurality of CPU cores have attained the busy status.

33. The computer program product of claim 27, wherein the busy status represents those of the plurality of CPU cores that have processed at least one of the write operations, the read operations, and the read and write operations during a predetermined threshold period.

34. The computer program product of claim 27, further including a fourth executable portion that assigns only the read operations to the plurality of CPU cores having an idle status, wherein the idle status represents those of the plurality of CPU cores that have yet to process any of the write operations, the read operations, and the read and write operations during a predetermined threshold period.

35. The computer program product of claim 34, further including a fifth executable portion that determines whether each one of the plurality of CPU cores had one of the idle status and the busy status during a last-predetermined threshold period.

36. The computer program product of claim 27, further including a fourth executable portion that determines the maximum number of the plurality of CPU cores by, according to a scale of the TMV having a lowest value at a left side and a highest TMV value at a right side, counting, from a firstmost positioned one of the plurality of CPU cores, and sequentially counting each CPU core to the right of the scale, until reaching a lastmost positioned one of the plurality of CPU cores, to include in the maximum number of the plurality of CPU cores to process the read operations.

37. The computer program product of claim 36, further including a fifth executable portion that determines the minimum number of the plurality of CPU cores by locating the lastmost positioned one of the plurality of CPU cores to process the write operations.

38. The computer program product of claim 37, further including a sixth executable portion that:
   if the lastmost positioned one of the plurality of CPU cores is determined to be in the busy status, and those of the plurality of CPU cores to the left of the lastmost positioned one of the plurality of CPU cores are in the idle status:
      permits one of the plurality of CPU cores that is to the immediate left of the lastmost positioned one of the plurality of read to process the write operations.

39. The computer program product of claim 38, further including a seventh executable portion that:
   if at least one or more of an nth number of lastmost positioned ones of the plurality of CPU cores are determined to be in the busy status, and all other of the plurality of CPU cores to the left of the at least one or more of the nth number of lastmost positioned ones of the plurality of CPU cores are in the idle status:
      permits an additional one of the at least one or more of the nth number of lastmost positioned ones of the plurality of CPU cores to process the write operations.

* * * * *